US010415409B2

(12) United States Patent
Oyarbide

(10) Patent No.: US 10,415,409 B2
(45) Date of Patent: Sep. 17, 2019

(54) NOZZLE GUIDE VANE AND METHOD FOR FORMING SUCH NOZZLE GUIDE VANE

(71) Applicant: Rolls-Royce Deutschland Ltd & Co KG, Blankenfelde-Mahlow (DE)

(72) Inventor: Asier Oyarbide, Duesseldorf (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 581 days.

(21) Appl. No.: 15/220,013

(22) Filed: Jul. 26, 2016

(65) Prior Publication Data
US 2017/0030210 A1 Feb. 2, 2017

(30) Foreign Application Priority Data
Jul. 28, 2015 (EP) .................................... 15178719

(51) Int. Cl.
B22D 29/00 (2006.01)
B22D 31/00 (2006.01)
B22C 9/10 (2006.01)
F01D 9/06 (2006.01)
F01D 5/08 (2006.01)
(Continued)

(52) U.S. Cl.
CPC .............. *F01D 9/065* (2013.01); *F01D 5/082* (2013.01); *F01D 5/187* (2013.01); *F01D 9/041* (2013.01); *F05D 2220/323* (2013.01); *F05D 2230/12* (2013.01); *F05D 2230/21* (2013.01); *F05D 2230/211* (2013.01); *F05D 2240/128* (2013.01); *F05D 2250/232* (2013.01); *F05D 2260/20* (2013.01); *Y02T 50/676* (2013.01)

(58) Field of Classification Search
CPC ...... B22D 29/00; B22D 29/001; B22D 31/00; B22C 9/10
USPC ....................... 164/516, 132, 369, 69.1, 76.1
See application file for complete search history.

(56) References Cited

U.S. PATENT DOCUMENTS 5,511,309 A    4/1996 Beabout
5,645,397 A    7/1997 Soechting et al.
(Continued)

FOREIGN PATENT DOCUMENTS

EP    1367224 A1    12/2003
EP    1522679 A2    4/2005
EP    2011968 A2    1/2009

OTHER PUBLICATIONS

European Search Report dated Jan. 27, 2016 from counterpart European App No. 15178719.9.

*Primary Examiner* — Kevin P Kerns
(74) *Attorney, Agent, or Firm* — Shuttleworth & Ingersoll, PLC; Timothy J. Klima

(57) ABSTRACT

A nozzle guide vane for a gas turbine engine includes an integrally formed angled nozzle with radially outer and inner platforms and an airfoil extending therebetween. An internal cooling air passage extends between the platforms. A cooling air outlet in the inner platform communicates with the air passage and opens to an inter stage cavity between stages of the engine and is formed as part of the nozzle with an outlet axis angled with respect to a radial direction of the engine. A transition area between a radially outwards facing part of the nozzle and an approximately linear outlet part including the outlet axis is formed as a curved conduit bend. An investment casting core member includes a cone-shaped part that defines the bend, a support part attached to the cone-shaped part and a cylindrical part which extends to the surface of the inner platform.

16 Claims, 5 Drawing Sheets

(51) Int. Cl.
*F01D 9/04* (2006.01)
*F01D 5/18* (2006.01)

(56) References Cited

U.S. PATENT DOCUMENTS

| | | |
|---|---|---|
| 6,357,999 B1 | 3/2002 | Pearce et al. |
| 2015/0010385 A1 | 1/2015 | Oyarbide et al. |

NOZZLE GUIDE VANE AND METHOD FOR FORMING SUCH NOZZLE GUIDE VANE

This application claims priority to European Patent Application 15 178 719.9 filed Jul. 28, 2015, the entirety of which is incorporated by reference herein.

The invention relates to a nozzle guide vane (NGV) with an integrated pre-swirl nozzle for use with a gas turbine engine, in particular an aircraft turbine engine, and to a method for forming such a nozzle guide vane as described in the claims.

Nozzle guide vanes (NGVs) are static components mounted into the casings of gas turbine engines as e.g. aircraft turbines. Typically, nozzle guide vanes are designed to convert part of the gas flow's heat and pressure energy into a tailored kinetic energy from which rotor blades can generate power. They are shaped to swirl the gas flow in the direction of the rotor's rotation, maximizing rotor efficiency.

In modern aircraft engines, it is standard practice to cool the airfoils of nozzle guide vanes that are exposed to high temperature. In certain engine applications it is it is also usual to cool the platforms of nozzle guide vanes.

U.S. Pat. No. 6,357,999 shows cooled nozzle guide vanes wherein the cooling fluid, typically air, is coming from a radially outer manifold that receives air from a bleed in a high pressure compressor section. This cooling air is flowed from the manifold into an aperture in a radially outer platform of the nozzle guide vanes, and within the vane airfoil radially inwards to a radially inner NGV platform where the cooling air exits through an angled nozzle device, also known as pre-swirl nozzle, formed in the inner NGV platform into an inner plenum chamber between two stages of the gas turbine engine.

Another example for a nozzle guide vane with an angled outflow duct machined in the radially inner NGV platform is disclosed in US 2015/0010385 A1.

As shown e.g. in EP 1 522 679 A2, usually a part of the cooling air flows also through rows of film cooling holes machined in the outer skin of the NGV airfoil, bathing the component's gas-washed exterior in a film of cool air.

The known solutions with the pre-swirl nozzle integrally formed with the nozzle guide vane, i.e. with no additional parts, have the advantage that the risk of free parts surfing in the inner plenum of a high pressure turbine is avoided. However, with the known integrally formed pre-swirl nozzles it is difficult to optimize the cooling flow in the inter stage cavity between two stages of the gas turbine engine as the cooling flow has to be blown in a certain direction to minimize the turbulence in the inter stage cavity with the rotating air in the inter stage cavity.

It is standard practice that internally cooled nozzle guide vanes are manufactured by investment casting with complex core geometries, maximizing the cooling effectiveness of the compressed cooling fluid.

Usually, the core component with the core part for the pre-swirl nozzle is manufactured with a ceramic core that extends at least parallel to a radially outward axis of the NGV airfoil, and an angled nozzle is drilled into the metal skin of the NGV platform from the specified location of the outlet aperture to an axial passage provided by the core during manufacturing. Accordingly, the cooling air flows through linear pipes inclined to each other wherein the flexibility to redirect the flow with using the same core design if boundary conditions change, and to change the restrictor by increasing or reducing angle or diameter is very limited on manufacturing.

EP 1 367 224 A1 discloses a turbine nozzle assembly of a gas turbine engine with a plurality of nozzles. Each nozzle includes an airfoil vane extending between a radially outer platform and a radially inner platform. A cooling circuit comprises a cooling cavity being defined by an inner surface of each vane, wherein a plurality of cooling film openings is positioned along a leading edge side.

US 2015/010385 A1 shows a stator vane with an outflow duct being formed in a vane root. In order to form an inter-stage seal an annular or ring segment-shaped sealing element is mounted on the vane root, wherein an annular space is formed between the sealing element and the vane root.

A vane assembly of a gas turbine engine is disclosed in U.S. Pat. No. 5,645,397 A. A cooling flow is directed from an internal cavity through a forward compartment of a vane via a cooling air exhaust passage and an annulus to a plurality of tangential on-board injectors of an inner vane support. The inner vane support is formed by a forward member and an aft member that are bolted together to form the annulus. The inner vane support is connected to the vane.

EP 2 011 968 A2 discloses a turbine stator assembly with a plurality of stator vanes. A cooling airflow streams from an upstream source through the stator vane and an angled on-board injector being connected to the stator vane. The angled on-board injector comprises a metering throat at an inward angle relative to an engine centerline.

U.S. Pat. No. 5,511,309 discloses a vane with an airfoil portion bounded at radial inner and outer ends thereof, by end structures. The vane comprises a leading edge passage with a cooling air inlet formed in the end structure and an outlet formed within the end structure, wherein the outlet is curved. Further, a method of fabrication of an airfoil blade or vane is disclosed, wherein a mold and a core are first fabricated, the core defining the shape of serpentine cooling air passages in the interior of the airfoil. The core is held in place by a core support rod attached to the core and protruding through the airfoil wall. After the casting process is completed, the core is dissolved by application of a chemical solution, the voids in the airfoil left by dissolving the core forming the serpentine cooling passages in the airfoil. The hole within the airfoil casting formed by removal of the core support rod is then closed and the cast part is machined into its final shape.

It is an object of the present invention to provide a nozzle guide vane of a gas turbine engine, in particular of an aircraft turbine engine, with an integral pre-swirl-nozzle nozzle and a method for manufacturing such a nozzle guide vane that has a design allowing an optimized cooling flow and that can be formed in a simplified and more flexible manufacturing process.

This object is achieved by the present invention with a nozzle guide vane according to the present disclosure and with a method for forming such a nozzle guide vane according to the present disclosure.

Further features, advantages and measures are disclosed herein. The features and measures disclosed herein can be combined with one another in advantageous ways.

According to the present invention there is provided a nozzle guide vane for use with a gas turbine engine with an integrally formed angled nozzle, including a radially outer platform and an radially inner platform with an airfoil extending there-between, having at least one internal cooling air passage extending between the respective platforms, wherein a cooling air outlet is provided in the radially inner platform, the cooling air outlet being in fluid communication with the internal cooling air passage, opening to an inter stage cavity between two stages of the gas turbine engine and being formed as part of the angled nozzle with an outlet axis being angled with respect to a radial direction of the gas turbine engine, wherein a transition area between a radially outwards facing part of the angled nozzle and an at least approximately linear outlet part of the angled nozzle comprising the outlet axis is formed as a curved conduit bend.

A nozzle guide vane according to the invention allows to optimize the cooling flow in an inter stage cavity located between two stages, the shaft and the flow path inner annulus of a gas turbine engine since the linear outlet part of the angled nozzle, also known as pre-swirl nozzle, can be machined with different angles and diameter having an interface with the curved conduit bend. Hereby, the cooling flow can be blown in a certain direction and with an amount of cooling air with low pressure losses in order to minimizethe turbulence in the inter stage cavity with the rotating air therein, and it can be ensured that the cooling air used is optimized.

The air inside an inter stage cavity is rotating due to the rotation of the parts in the cavity, and blowing this air with a certain angle of the nozzle, related to a main axis of the engine, into the cavity will reduce turbulences in the flow. Further, a loss of energy of the cooling air due to this turbulence will be significantly reduced, and hereby, the cooling efficiency is increased respectively.

According to a preferred embodiment of the invention, the conduit bend is cone-shaped with narrowing diameter towards the outlet part of the angled nozzle.

The conical end of the curved bend is advantageous in providing a high flexibility for designers and secondary air systems engineers in choosing the angle for the linear outlet part of the angled nozzle with low impact on pressure losses as the interface of the casted cone and the machining diameter will create a smooth transition. This is in particular useful in case of a late requirement in design change due to updated thermal conditions, and is especially important in the development phase, where new data is arriving during the development of the part.

Advantageously, the outlet axis of the angled nozzle forms an angle with an axis of the radially outwards facing part of the angled nozzle of more than 90°, preferably between 100° and 107°.

In a further preferred embodiment of the inventive nozzle guide vane, the radially outwards facing part of the angled nozzle comprises a linear or at least approximately linear tube part. This can have approximately the same diameter as the adjacent radially outwards facing part of the curved conduit bend, and can be designed to take cooling air directly from a cavity within the airfoil of the nozzle guide vane, or can be designed for connecting at its radially outwards facing end with an impingement insert within the airfoil.

The invention also provides a method of forming a nozzle guide vane with an integral angled nozzle as claimed in any of the device claims, the method including investment casting metal around a core member that defines an internal cavity and internal features of the nozzle guide vane and comprises a support part, removing the core member, and performing a machining operation, wherein the at least approximately linear outlet part of the angled nozzle is formed by the machining operation and the core member comprises for forming the conduit bend of the angled nozzle a cone-shaped part that defines the bend, and the support part with webs attached to the cone-shaped part on one side and to a cylindrical part on the other side, and wherein the cylindrical part is extending at least to the surface of the metal defining the radially inner platform of the nozzle guide vane.

The inventive method combines different concepts to facilitate the forming of a nozzle guide vane with integral angled nozzle while providing a high flexibility for manufacturers in redesigning the angled nozzle geometry, in particular the cooling air outlet angle and diameter, due to e.g. a change in boundary conditions.

Using the cone-shaped part for forming the curved conduit bend allows a simple realization of a bend in the angled nozzle with a smooth transition of cooling air to the desired swirl angle in order to avoid pressure losses and a decrease in efficiency.

The support part with webs and the cylindrical part has the advantage that the webs increase the effective surface of the bend but provide enough stiffness to the core member to support the loads during the casting process.

Further, the cylinder part avoids breakages in the manufacturing and can be used to hold one of the sides of the core member in a wax pattern die during the casting to machining interface. When using a so-called lost wax molding process, the casting provides a block of metal in the inner NGV platform where the angled nozzle restrictor will be machined, wherein this block of metal has an acceptable ration of length/diameter to ensure that the cooling air can be blown in the desired direction.

With the method according to the invention, the machining operation for forming the linear outlet part is preferably performed from a starting point on the surface of the metal defining the pre-determined cooling air outlet of the angled nozzle on the radially inner platform of the nozzle guide vane until meeting the facing end of the cone-shaped core part, wherein the starting point is chosen according to a pre-determined swirl angle of the angled nozzle.

Advantageously, the machining operation is performed by conventional machining processes such as e. g. drilling or milling, or by EDM (Electrical Discharge Machining) with a diameter chosen according to a pre-determined airflow section of the cooling air outlet of the angled nozzle. In case of EDM, the shape of the section can be non-cylindrical and maximized to increase the flow into the cavity. The casting should have a provision of metal on the inner shroud where the operation is performed to create the passage, ending in an at least perpendicular face where the tool will start the machining operation. The length of this provision of metal in the casting is preferably at least twice the nominal diameter of the hole.

In order to ensure enough stiffness to the core member during the casting, the webs of the support part are preferably forming a trident or a cross transversal section.

Further, the cylindrical part of the support part is used for determining the position of the core member.

When having the sheet metal fabricated nozzle after removing the core member, the volume of the support part should be filled at least partly, preferably by a welding process, to avoid leakages.

As a suitable material for the core member a ceramic material can be chosen that is removable by a chemical process.

The features, functions and advantages can be achieved independently in various embodiments of the present disclosure or may be combined in yet other embodiments. Advantageous embodiments as well as a preferred mode of use, and further details and advantages thereof will best be understood by reference to the following description and drawings of an exemplary embodiment.

In the drawings,

FIG. 7 shows from another perspective the area of the pre-swirl nozzle of

Figure 6:
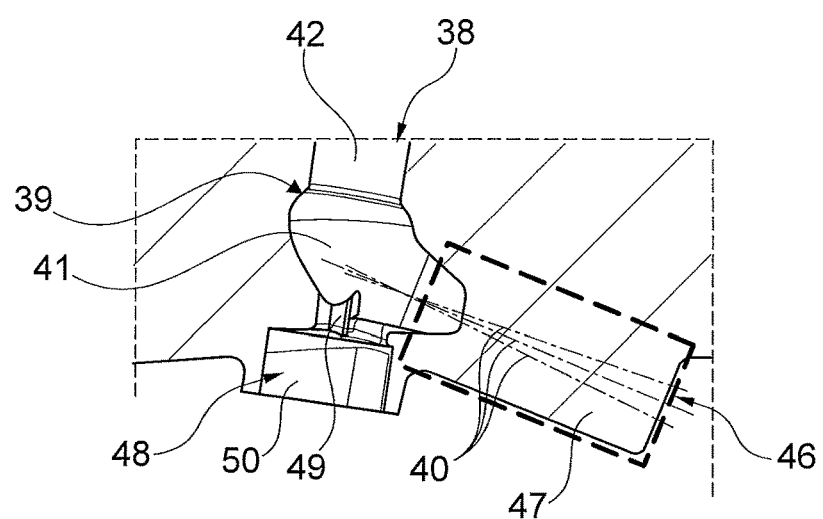
FIG. 6 shows a section view of the casting with the pre-swirl nozzle ceramic core of FIG. 3 and FIG. 4 as well as a metal block for provision to drill a cooling air outlet of the pre-swirl nozzle.
Figure 7:
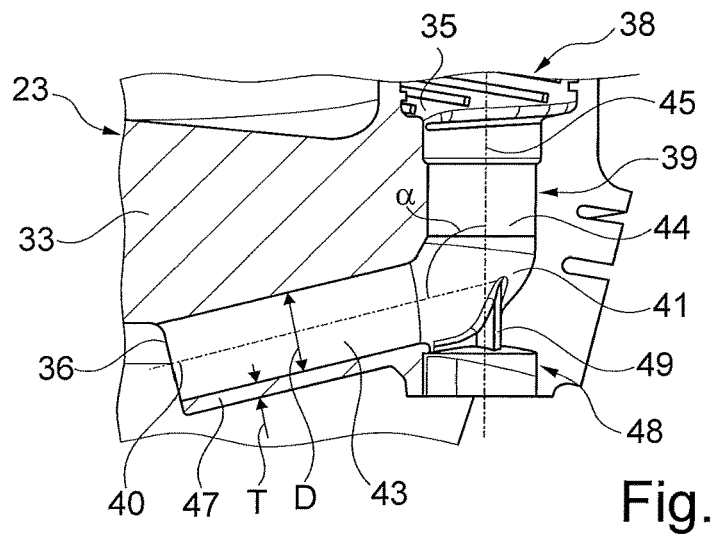
Figure 8:
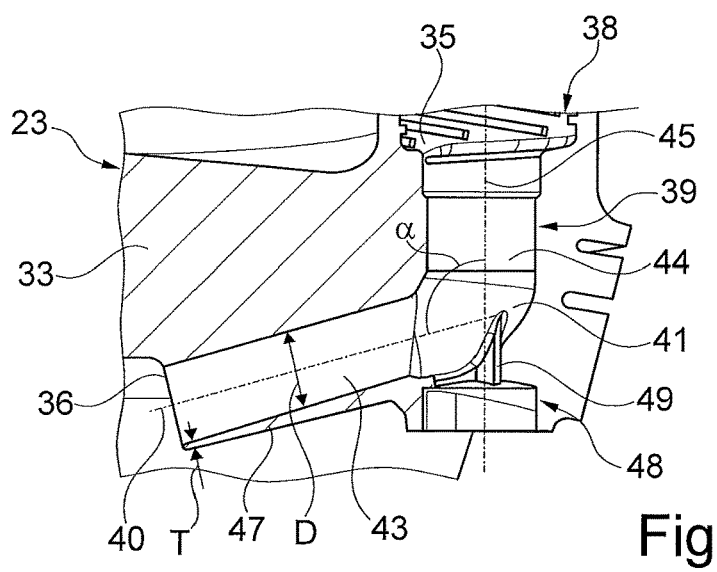
Figure 9:
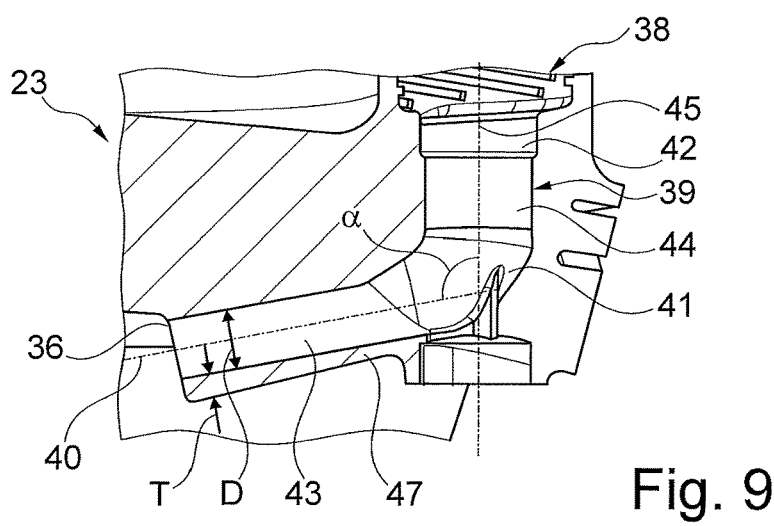

FIG. 6 with a first embodiment of a drilling of the cooling air outlet;

FIG. 8 shows from the perspective of FIG. 7 the area of the pre-swirl nozzle with a second embodiment of a drilling of the cooling air outlet; and FIG. 9 shows from the perspective of FIG. 7 and FIG. 8 the area of the pre-swirl nozzle with a third embodiment of a drilling of the cooling air outlet.

Figure 1:
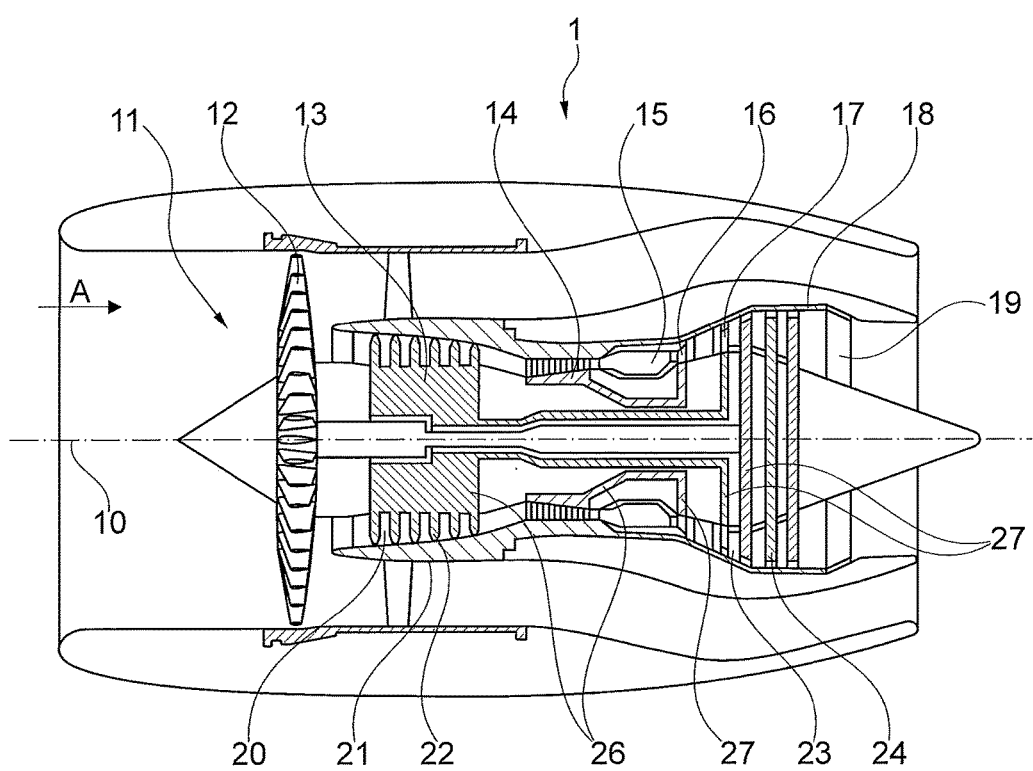
FIG. 1 shows a schematic representation of a gas turbine engine providing nozzle guide vanes according to the invention.

The gas-turbine engine 1 shown in FIG. 1 is a general example of a gas turbine engine where the invention can be used. The present engine 1 is an aircraft turbine engine of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 10.

The intermediate-pressure compressor 13 and the high-pressure compressor 14 each include several stages, of which each has an arrangement extending in the circumferential direction of fixed and stationary guide vanes 20 projecting radially inwards from an engine casing 21 into an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed nozzle guide vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 10 during operation.

Figure 2:
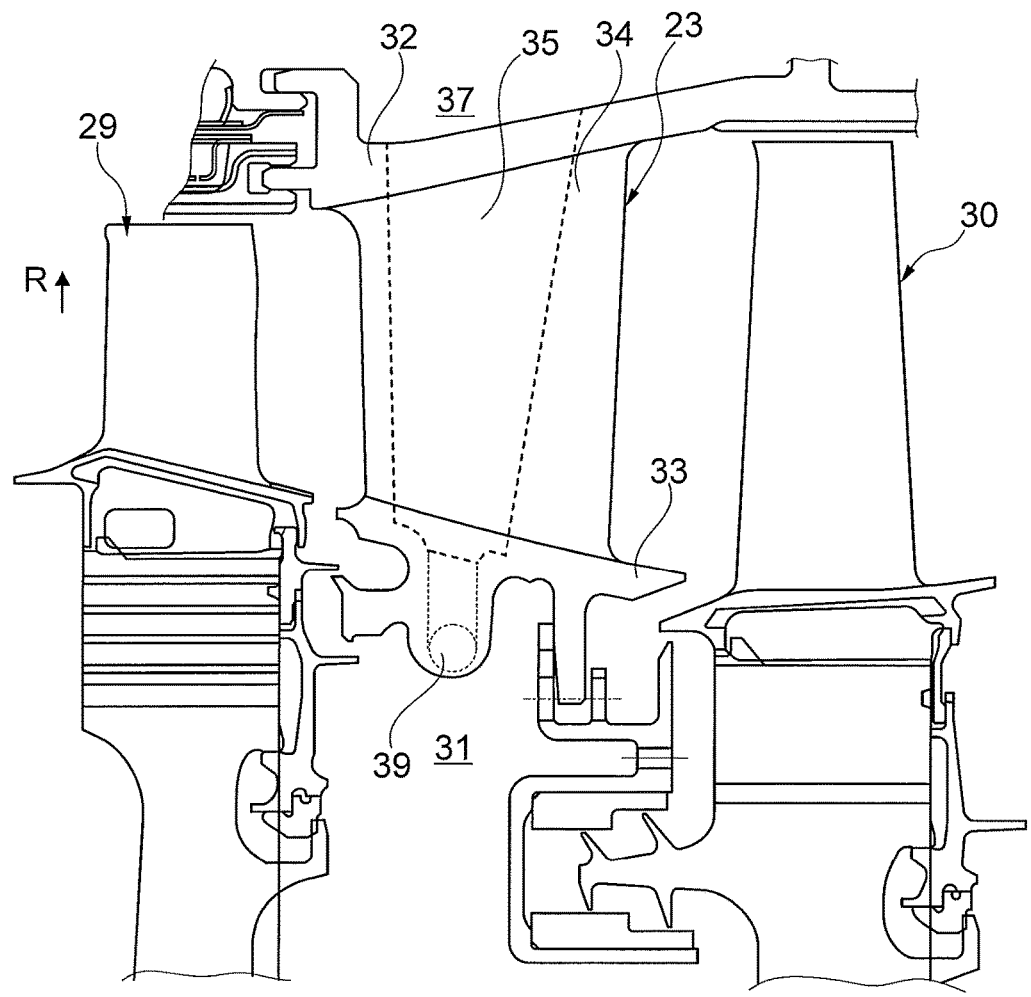
FIG. 2 shows a partial section view of a nozzle guide vane and an inter stage cavity of the gas turbine engine of FIG. 1.

FIG. 2 shows an exemplary embodiment of a nozzle guide vane 23 between two stages 29 and 30 of the high pressure turbine 16 with an inter stage cavity 31. The nozzle guide vane 23 is shown here in schematic representation which includes a radially outer platform 32 and a radially inner platform 33 with an airfoil 34 extending between the platforms 32, 33.

The nozzle guide vane 23 is designed hollow and has a vane interior into which cooling air can be introduced.

In a high pressure turbine, temperatures are very high and the inter stage cavity 31 needs to be cooled down to prevent failure of the rotors. The necessary cooling air is typically taken from a compressor, and is distributed in the high pressure turbine 16 through external pipes and blown into a plenum 37 on top of the nozzle guide vane 23. The cooling air flows from there against the radial direction R through an schematically indicated internal cooling air passage 35, which may also be part of an insert, from the radially outer platform 32 to the radially inner platform 33 where a cooling air outlet 36 is provided in the area of the radially inner platform 33. Some of the cooling air is used for cooling the nozzle guide vane 23, and the remaining flow blown out through the cooling air outlet 36 is used to pressurize and cooling the inter stage cavity 31.

Figure 3:
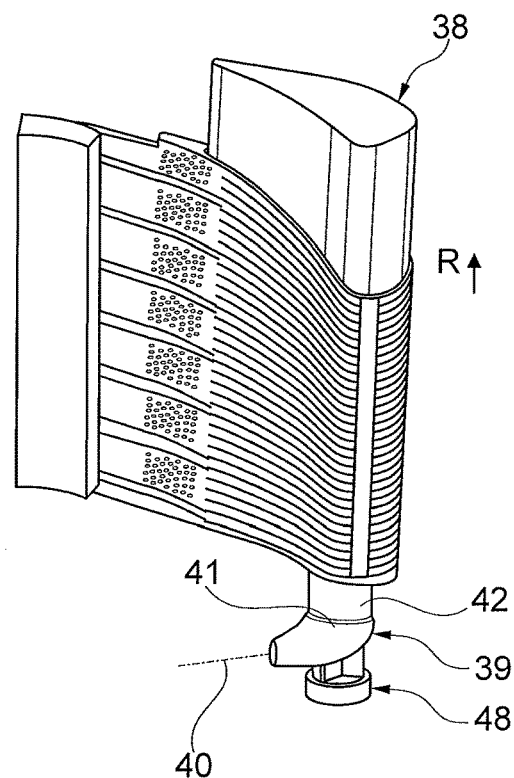
FIG. 3 shows a simplified perspective view of a ceramic core member for manufacturing a nozzle guide vane with an integral pre-swirl nozzle core.
Figure 4:
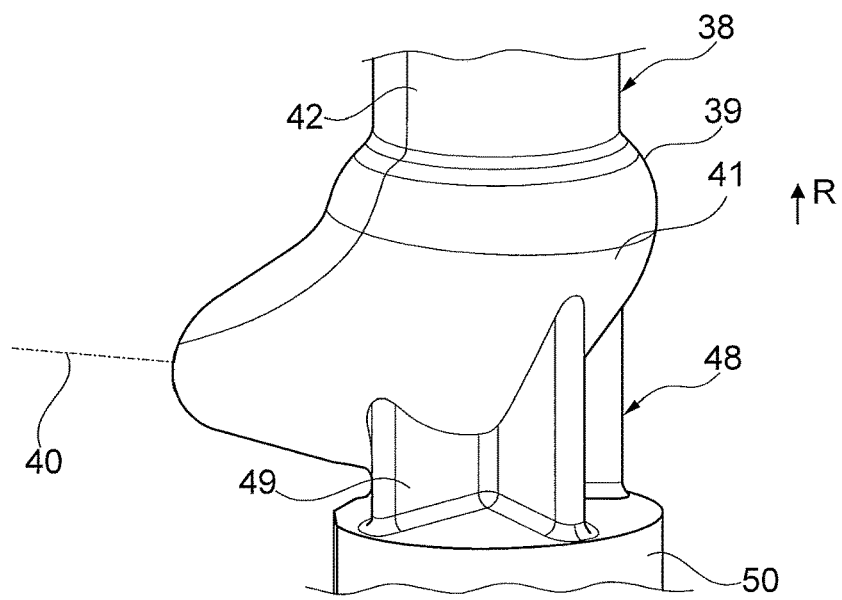
FIG. 4 shows from another perspective the part of the ceramic core member of FIG. 3 forming the pre-swirl nozzle core.

The nozzle guide vane 23 is formed by means of an investment casting method. As it is standard practice, a so-called lost wax molding process is used. Essentially, a ceramic core member 38 shown in FIG. 3 to FIG. 4 and in FIG. 6 to FIG. 9 is initially formed in a tooling die. Wax is placed around that core member to form the external contour of the nozzle guide vane 23. An outer mould, or shell is built up around the wax using a ceramic slurry. The wax is then melted, leaving a space into which liquid metal is filled in. The metal is then allowed to solidify, and the outer shell is removed. The ceramic core member 38 is captured within the metal, forming the nozzle guide vane 23. A chemical leaching process is utilized to dissolve the ceramic core member 38, leaving hollows within the metal aerofoil. In this way, a cooling passage 35 in the nozzle guide vane 23 is formed.

As can be best seen from the core member 38, the cooling air outlet 36 formed as part of a pre-swirl nozzle 39 with an outlet axis 40 being angled with respect to the radial direction R of the nozzle guide vane 23.

Within the pre-swirl nozzle 39, a transition area between a radially outwards facing part 42 of the pre-swirl nozzle 39 and a linear outlet part 43 of the pre-swirl nozzle 39 comprising the outlet axis 40 is formed as a curved conduit bend 41.

Via the curved conduit bend 41 the cooling air is blown to the right direction reducing significantly the pressure losses, and therefore reducing the amount of air required to cool down and pressurize the inter stage cavity 31.

The conduit bend 41 and the respective part of the core member 38 defining the bend in the casting process is cone-shaped with narrowing diameter towards the outlet part 36, 43 of the pre-swirl nozzle 39, while the radially outwards facing part 42 of the pre-swirl nozzle 39 comprises a linear tube part 44. The outlet axis 40 of the pre-swirl nozzle 39 forms an angle α with an axis 45 of the radially outwards facing part 42 of the pre-swirl nozzle 39 of more than 90°, that preferably varies between 100° and 107° resulting in a range 46 schematically shown in FIG. 6.

In the embodiment shown in FIG. 7 the angle α has 103.45°, the diameter of the linear, radially inwards facing part 43 has 5.6 mm and the minimum remaining wall thickness T of the metal 47 is constant with 1.1 mm.

To illustrate the manufacturing flexibility of the design, in FIG. 8 and FIG. 9 different possible measures are shown exemplary. In the embodiment shown in FIG. 8 the angle α has 106.45°, the diameter of the linear, the outlet facing part 43 is maximal with 6 mm and the minimum remaining wall thickness T of the metal 47 is decreasing to 0.9 mm at the outlet 36. In the embodiment shown in FIG. 9 the angle α has 100.45°, the diameter of the linear, the outlet facing part 43 is the smallest with maximal with 4.4 mm, while the minimum remaining wall thickness T of the metal 47 is 1 mm in the interface area with the bend 41, and increasing towards the outlet 36.

In the investment casting process the core member 38 needs to exactly positioned and supported against the loads affecting it when metal 47 is filled around the core member 38.

For this reason the core member 38 is provided with a support part 48 with webs 49 attached to the cone-shaped part 41 on one side and to a cylindrical part 50 on the other side wherein the cylindrical part 50 is extending at least to the surface of the metal 47 defining the radially inner platform 33 of the nozzle guide vane 23. With the cylindrical part 50 the ceramic core 38 is hold in the wax pattern die for determining the position of the core member 38.

Figure 5:
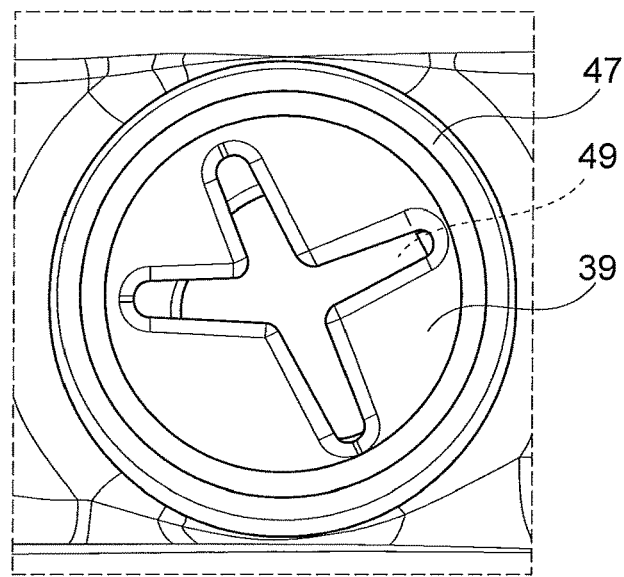
FIG. 5 shows a simplified top on the cast of the pre-swirl nozzle core after removing the part of the core member shown in FIG. 4.

In the shown embodiment, the webs 49 of the support part 48 are forming a cross in their transversal section. The cross webs 49 allow a high strength in supporting the core member 38 during the casting process while using only a small cross section with minimal impact on the surface of the conduit bend 41. The remaining cross-shaped hole after removing the ceramic core member 38, as shown in FIG. 5, has to be filled in a simple manner e.g. by welding.

The forming of the linear, outwards facing outlet part 42 can be performed by EDM or by a conventional machining operation such as drilling or milling. When drilling the outlet part 42, the starting point on the surface of the metal 47 is the pre-determined cooling air outlet 36 of the pre-swirl nozzle 39 on the radially inner platform 33 of the nozzle guide vane 23. The drilling is performed according to the pre-determined swirl angle of the pre-swirl nozzle 39 until meeting the facing end of the cone-shaped core part 41.

If using EDM, the flexibility is enhanced since the hole does not need to be a cylinder and the cross section can be maximized.

LIST OF REFERENCE SIGNS

1 Gas-turbine engine/core engine
10 Engine axis
11 Air inlet
12 Fan
13 Intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Stator vanes
21 Engine casing
22 Compressor rotor blades
23 Nozzle guide vanes
24 Turbine blades
26 Compressor drum or disk
27 Turbine rotor hub
29 Engine stage
30 Engine stage
31 Inter stage cavity
32 Outer platform
33 Inner platform
34 Airfoil
35 Cooling air passage
36 Cooling air outlet
37 Plenum
38 Core member
39 Pre-swirl nozzle
40 Outlet axis
41 Transition area, conduit bend
42 Radially outwards facing part of pre-swirl nozzle
43 Radially inwards facing part of pre-swirl nozzle
44 Linear tubular part
45 Axis
46 Range for cooling air outlet
47 Metal
48 Support part
49 Webs
50 Cylindrical part
A Axial direction
D Diameter
R Radial direction
T Wall thickness
α Angle

The invention claimed is:

1. A method of forming a nozzle guide vane with an integral angled nozzle for use with a gas turbine engine, comprising:
   investment casting metal around a core member that defines an internal cavity and internal features of the nozzle guide vane and comprises a support part,
   removing the core member,
   performing a machining operation to form a predominately linear outlet part of the angled nozzle,
   providing that the core member includes a cone-shaped part that defines a conduit bend of the angled nozzle, for forming the conduit bend of the angled nozzle,
   providing that the support part includes webs that are attached to the cone-shaped part on one side and to a cylindrical part on another side,
   providing that the cylindrical part extends at least to a surface of the metal defining a radially inner platform of the nozzle guide vane.

2. The method as claimed in claim 1, and further comprising:
   performing the machining operation from a starting point on the surface of the metal defining a pre-determined cooling air outlet of the angled nozzle on the radially inner platform of the nozzle guide vane until meeting a facing end of the cone-shaped part of the core member,
   choosing the starting point according to a pre-determined swirl angle of the angled nozzle.

3. The method as claimed in claim 2, and further comprising performing the machining operation by EDM (Electrical Discharge Machining) with a certain cross section of the predominately linear outlet part of the angled nozzle or drilling or milling with a diameter chosen according to a pre-determined airflow section of a cooling air outlet of the angled nozzle.

4. The method as claimed in claim 3, and further comprising providing that the webs form a trident or a cross transversal section.

5. The method as claimed in claim 4, and further comprising using a ceramic material for the core member and removing the ceramic material with a chemical process.

6. The method as claimed in claim 5, and further comprising filling a volume of the support part at least partly, after removing the core member to avoid any leakage through the webs.

7. The method as claimed in claim 6, wherein the filling is performed by a welding process.

8. The method as claimed in claim 2, and further comprising providing that the webs form a trident or a cross transversal section.

9. The method as claimed in claim 8, and further comprising using a ceramic material for the core member and removing the ceramic material with a chemical process.

10. The method as claimed in claim 9, and further comprising filling a volume of the support part at least partly, after removing the core member to avoid any leakage through the webs.

11. The method as claimed in claim 10, wherein the filling is performed by a welding process.

12. The method as claimed in claim 1, and further comprising performing the machining operation by EDM (Electrical Discharge Machining) with a certain cross section of the predominately linear outlet part of the angled nozzle or drilling or milling with a diameter chosen according to a pre-determined airflow section of a cooling air outlet of the angled nozzle.

13. The method as claimed in claim 1, and further comprising providing that the webs form a trident or a cross transversal section.

14. The method as claimed in claim 1, and further comprising using a ceramic material for the core member and removing the ceramic material with a chemical process.

15. The method as claimed in claim 1, and further comprising filling a volume of the support part at least partly, after removing the core member to avoid any leakage through the webs.

16. The method as claimed in claim 15, wherein the filling is performed by a welding process.

* * * * *